United States Patent
Poinssot et al.

(10) Patent No.: US 12,157,148 B2
(45) Date of Patent: Dec. 3, 2024

(54) AUTOMATED BATTERY SORTING SYSTEM

(71) Applicant: Redwood Materials, Inc., Carson City, NV (US)

(72) Inventors: Sylvain Poinssot, Reno, NV (US); Nick Amuchastegui, Talent, OR (US); Samhith Pendly, Reno, NV (US); Isaac Thomas, Carson City, NV (US); Carter Price, Reno, NV (US)

(73) Assignee: Redwood Materials, Inc., Carson City, NV (US)

( * ) Notice: Subject to any disclaimer, the term of this patent is extended or adjusted under 35 U.S.C. 154(b) by 0 days.

(21) Appl. No.: 18/452,961

(22) Filed: Aug. 21, 2023

(65) Prior Publication Data

US 2024/0066557 A1 Feb. 29, 2024

Related U.S. Application Data

(60) Provisional application No. 63/373,380, filed on Aug. 24, 2022.

(51) Int. Cl.
*B07C 5/36* (2006.01)
*B07C 5/34* (2006.01)
(Continued)

(52) U.S. Cl.
CPC .............. *B07C 5/36* (2013.01); *B07C 5/3412* (2013.01); *B07C 5/3416* (2013.01);
(Continued)

(58) Field of Classification Search
CPC ....... B07C 5/36; B07C 5/3416; B07C 5/3422; B65G 47/1407; B65G 47/493
See application file for complete search history.

(56) References Cited

U.S. PATENT DOCUMENTS

| 11,030,442 B1 | 6/2021 | Bergamo et al. |
| 11,660,642 B1 * | 5/2023 | Linev .................. G01N 23/083 378/62 |

(Continued)

FOREIGN PATENT DOCUMENTS

| RU | 2631833 C1 | 9/2017 |
| WO | 2022/093420 A1 | 5/2022 |

OTHER PUBLICATIONS

International Search Report and Written Opinion received in PCT/US2023/072664 dated Mar. 28, 2024.
Moore. "University of Extrication: Electric Vehicle Fire Suppression" Firehouse; Article [online]. Mar. 2022 [retrieved Jan. 30, 2024]. Retrieved from the Internet: https://www.firehouse.com/operations-lraining/article/21255066/university-of-extrication-electricvehicle-fire-supression; entire document.

*Primary Examiner* — Michael McCullough
*Assistant Examiner* — Jessica L Burkman
(74) *Attorney, Agent, or Firm* — Keller Preece PLLC

(57) ABSTRACT

The present disclosure relates to systems, non-transitory computer-readable media, and methods for analyzing and sorting batteries according to battery classifications. In particular, in one or more embodiments, the disclosed systems scan a target battery with a plurality of sensors and analyze signals of the plurality of sensors utilizing a classifier model to determine a battery classification for the target battery. Also, in some embodiments, the disclosed systems indicate the predicted battery classification to a battery sorting mechanism for sorting the target battery. Additional mechanisms and related methods for automated classification and sorting of batteries are disclosed.

20 Claims, 13 Drawing Sheets

(51) Int. Cl.
*B07C 5/342* (2006.01)
*B65G 47/14* (2006.01)
*B65G 47/49* (2006.01)
*G06N 3/045* (2023.01)
*G06V 10/764* (2022.01)
*G06V 10/82* (2022.01)
*G06V 20/62* (2022.01)

(52) U.S. Cl.
CPC ............ *B07C 5/3422* (2013.01); *B07C 5/361* (2013.01); *B65G 47/1407* (2013.01); *B65G 47/493* (2013.01); *G06N 3/045* (2023.01); *G06V 10/764* (2022.01); *G06V 10/82* (2022.01); *G06V 20/62* (2022.01); *B07C 2501/0054* (2013.01); *B65G 2207/22* (2013.01)

(56) References Cited

U.S. PATENT DOCUMENTS

| | | | |
|---|---|---|---|
| 11,747,290 B2 * | 9/2023 | Young | B07C 5/34 |
| | | | 209/576 |
| 2019/0030571 A1 * | 1/2019 | Horowitz | B07C 5/367 |
| 2022/0080466 A1 | 3/2022 | Parr et al. | |
| 2022/0347724 A1 * | 11/2022 | Fourney | B07C 1/14 |
| 2022/0416323 A1 * | 12/2022 | Diegoli | H01M 10/54 |

* cited by examiner

AUTOMATED BATTERY SORTING SYSTEM

CROSS-REFERENCE TO RELATED APPLICATIONS

The present application claims the benefit of, and priority to, U.S. Provisional Patent Application No. 63/373,380, filed on Aug. 24, 2022, and entitled Automated Battery Sorting Systems and Methods of Using the Same. The aforementioned patent application is hereby incorporated by reference in its entirety.

BACKGROUND

Recent years have seen a significant increase in the implementation of various types of batteries as an alternative to fossil fuels and other sources of energy. Moreover, the recent surge in popularity of electric vehicles and other electronic devices has resulted in a significant increase in demand for battery production, as well as an increased demand for safe and efficient recycling or disposal of batteries and battery materials.

Despite advances in battery production and implementation in various fields of use, existing methods for mass recycling and/or disposal of batteries and battery materials face several shortcomings. For example, conventional systems can safely recycle or dispose of batteries of particular chemical compositions, such lithium-ion batteries. However, certain compositions of batteries are difficult or impossible to recycle in a safe and efficient manner. Accordingly, batteries of varying classifications must be sorted with a high level of certainty prior to recycling or disposal. Unfortunately, conventional methods of classifying and sorting batteries generally require human attention and scrutiny of each battery, resulting in an inefficient and often inaccurate procedure when processing large numbers of batteries for recycling and/or disposal.

These along with additional problems and issues exist with regard to conventional battery recycling systems.

BRIEF SUMMARY

Embodiments of the present disclosure provide benefits and/or solve one or more of the foregoing or other problems in the art with systems, apparatuses, non-transitory computer-readable media, and methods for automatically classifying and sorting batteries of varying classifications. For example, the disclosed systems intelligently classify and sort batteries according to chemical composition, form factor, and/or other classifications utilizing various sensors and sorting mechanisms.

In some embodiments, for example, an apparatus for sorting batteries of various configurations comprises a hopper mechanism configured to individually discharge batteries onto a conveyor, a scanner mechanism with a plurality of sensors configured to determine predicted battery configurations for each battery. The apparatus also includes an array of sorting mechanisms configured to transfer the batteries to a plurality of bins according to the predicted battery configurations. In one or more embodiments, additional sensors, such as an infrared (IR) camera, are implemented to detect anomalies in discharged batteries, such as elevated temperatures.

Moreover, in one or more embodiments, a battery classification system receives, from a plurality of sensors, a plurality of signals corresponding to a target battery. For example, the plurality of sensors comprises two or more of an x-ray scanning array, a three-dimensional (3D) scanner, and RGB camera, or an infrared camera. In response, utilizing a classifier model, the system determines a predicted battery classification of the target battery from the plurality of battery classifications based on the plurality of signals. In one or more embodiments, the system indicates the predicted battery classification to a battery sorting mechanism.

Accordingly, the disclosed embodiments provide significant advantages over existing solutions, such as increased efficiency enabled by automated battery classification and sorting. Further, the disclosed embodiments exhibit increased safety by precluding the need for human interaction with potentially volatile or unstable batteries, by accurately predicting battery classifications to avoid mishaps in subsequent processing, and by providing increased measures for detecting battery anomalies throughout the classification and sorting process.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
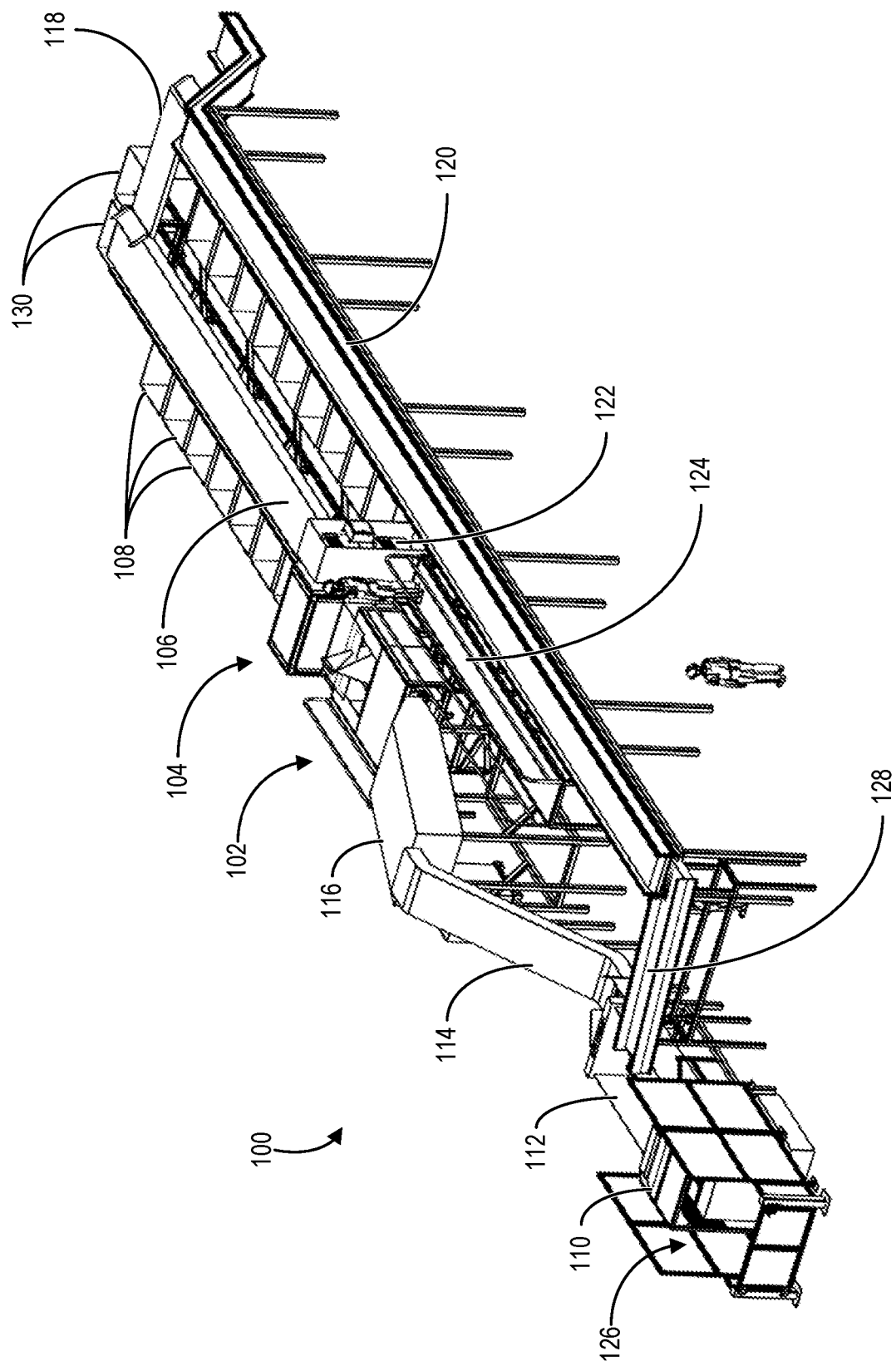
FIG. 1 illustrates a perspective view of an automated battery sorting system in accordance with one or more embodiments.

This disclosure describes one or more embodiments of a battery classification system that intelligently classifies batteries of various configurations based on inputs from a variety of sensors. For example, in some implementations, the battery classification system utilizes a battery classifier machine learning model, based on various sensor signals, to predict battery classifications for target batteries. In addition, some embodiments include a battery sorting mechanism configured to sort batteries according to battery classifications predicted by embodiments of the battery classification system.

In some embodiments, for example, a battery classification system receives, from a plurality of sensors, a plurality of signals corresponding to a target battery. In response, the battery classification system determines, utilizing the classifier machine learning model, a predicted battery classification of the battery from the plurality of battery classifications based on the plurality of signals. Also, in some embodiments, the battery classification system indicates, to a battery sorting mechanism, the predicted battery classification. Moreover, in some embodiments, the plurality of sensors comprises two or more of an x-ray scanning array, a three-dimensional (3D) scanner, an RGB camera, or an infrared camera.

Additionally, one or more embodiments of an apparatus for sorting batteries of various configurations comprises a hopper mechanism, a scanner mechanism, and an array of sorting mechanisms. In some embodiments, the hopper mechanism is configured to individually discharge batteries of a plurality of batteries onto a conveyor. Further, the scanner mechanism, in some embodiments, is disposed about the conveyor and comprises multiple types of sensors configured to determine a predicted battery configuration for each battery from a plurality of battery configurations. Also, in some embodiments, the array of sorting mechanisms is disposed about the conveyor and configured to transfer the plurality of batteries from the conveyor to a plurality of bins based on the predicted battery configuration of each battery of the plurality of batteries.

Thus, the disclosed embodiments provide for automated classification and sorting of batteries comprising a variety of classifications, such as but not limited to chemical compositions, form factors, and other configurations. Furthermore, utilizing a variety of sensors to scan and analyze individual batteries, such as but not limited to three-dimensional (3D) scanners, x-ray scanning arrays, RGB cameras, and infrared (IR) cameras, the disclosed systems accurately and efficiently classify and sort batteries for further processing. Indeed, the disclosed systems can identify/classify batteries of a variety of classifications and sort large quantities of batteries accordingly while improving safety and efficiency. In addition, one or more of the disclosed embodiments utilize a classifier machine learning model to predict battery classifications intelligently and efficiently according to data provided by a database of battery classifications.

Accordingly, the disclosed battery classification and sorting systems provide many advantages and benefits over conventional systems and methods. For example, by utilizing a plurality of sensor types and a trained classifier model, the battery classification system improves accuracy relative to conventional systems. Specifically, the disclosed embodiments analyze and compare a variety of attributes provided by sensors with a data library of battery classifications utilizing a classifier machine learning model to intelligently identify battery classifications in an automated process.

Furthermore, by utilizing an automated process for determining battery classifications with a trained classifier model, the disclosed systems improve efficiency relative to conventional systems. Specifically, the disclosed embodiments intelligently analyze and determine classifications for large quantities of batteries automatically and, in most implementations, without the need for human consideration of each battery. Thus, the disclosed systems can accurately efficiently sort batteries into batches according to their predicted classifications.

In addition, the disclosed systems improve the safety of processes for identifying and sorting batteries for recycling and/or disposal. Specifically, the disclosed systems reliably predict battery classifications to avoid inadvertent processing of batteries by erroneous procedures. For example, batteries having certain chemical compositions can be impossible or uneconomical to process by typical processes, while other types of batteries are readily recycled by known procedures. Moreover, by utilizing sensors, such as infrared (IR) cameras, to scan batteries for anomalies (e.g., elevated temperatures), the disclosed systems can prevent mishaps involving volatile materials typical to many batteries.

As illustrated by the foregoing discussion, the present disclosure utilizes a variety of terms to describe features and advantages of the disclosed systems. Additional detail is now provided regarding the meaning of such terms. For example, as used herein, the term "machine learning model" refers to a model that can be trained and/or tuned based on inputs to approximate unknown functions. For example, the term "machine learning model" can include but is not limited to a random forest model, a decision tree (e.g., a series of gradient boosted decision trees (e.g., XGBoost algorithm)), a multilayer perceptron, a linear regression, a support vector machine, a deep learning architecture, a deep learning transformer (e.g., self-attention transformer), or a logistic regression. In other embodiments, the machine learning model includes a neural network, such as a convolutional neural network, a recurrent neural network (e.g., an LSTM), a graph neural network, a self-attention transformer neural network, a diffusion neural network, or a generative adversarial neural network.

As used herein, the term "x-ray attenuation" refers to the reduction of the intensity of an x-ray as it traverses matter, which can be caused by absorption or by deflection of photons from the x-ray beam. X-ray attenuation can be affected by different factors such as beam energy and atomic energy of the material absorbing the x-ray. In particular, the disclosed systems consider detected x-ray attenuation in determining the chemical and/or material composition of target batteries, as discussed in greater detail below.

As used herein, the term "object recognition" refers to a computer technology for finding and identifying objects in an image. For example, the term "object recognition" can include but is not limited to appearance-based methods, edge matching, segmentation methods, greyscale matching, gradient matching, object detection neural networks, decision trees, or any of various models trained to recognize objects within images.

Figure 2:
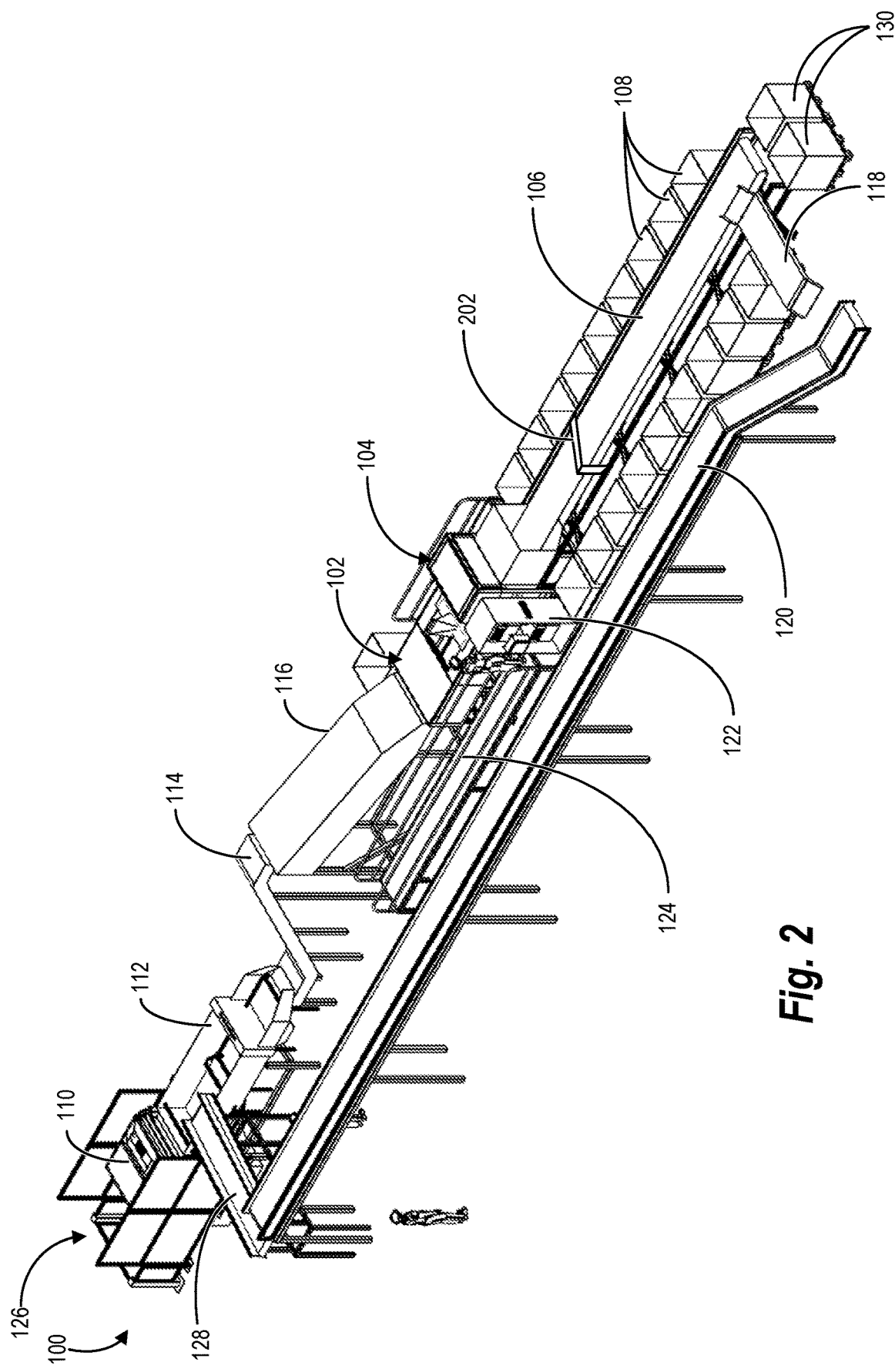
FIG. 2 illustrates an additional perspective view of an automated battery sorting system in accordance with one or more embodiments.
Figure 3:
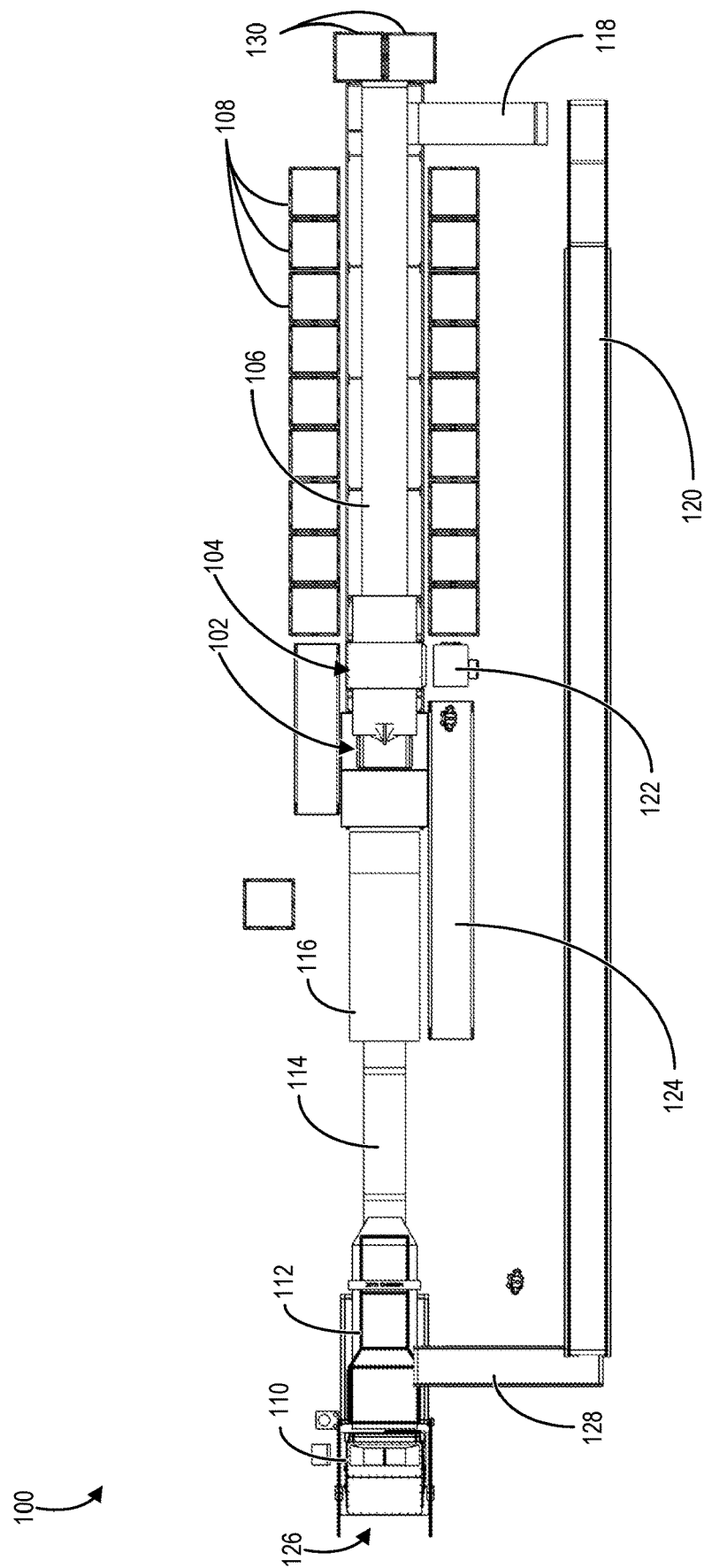
FIG. 3 illustrates a top view of an automated battery sorting system in accordance with one or more embodiments.
Figure 4:
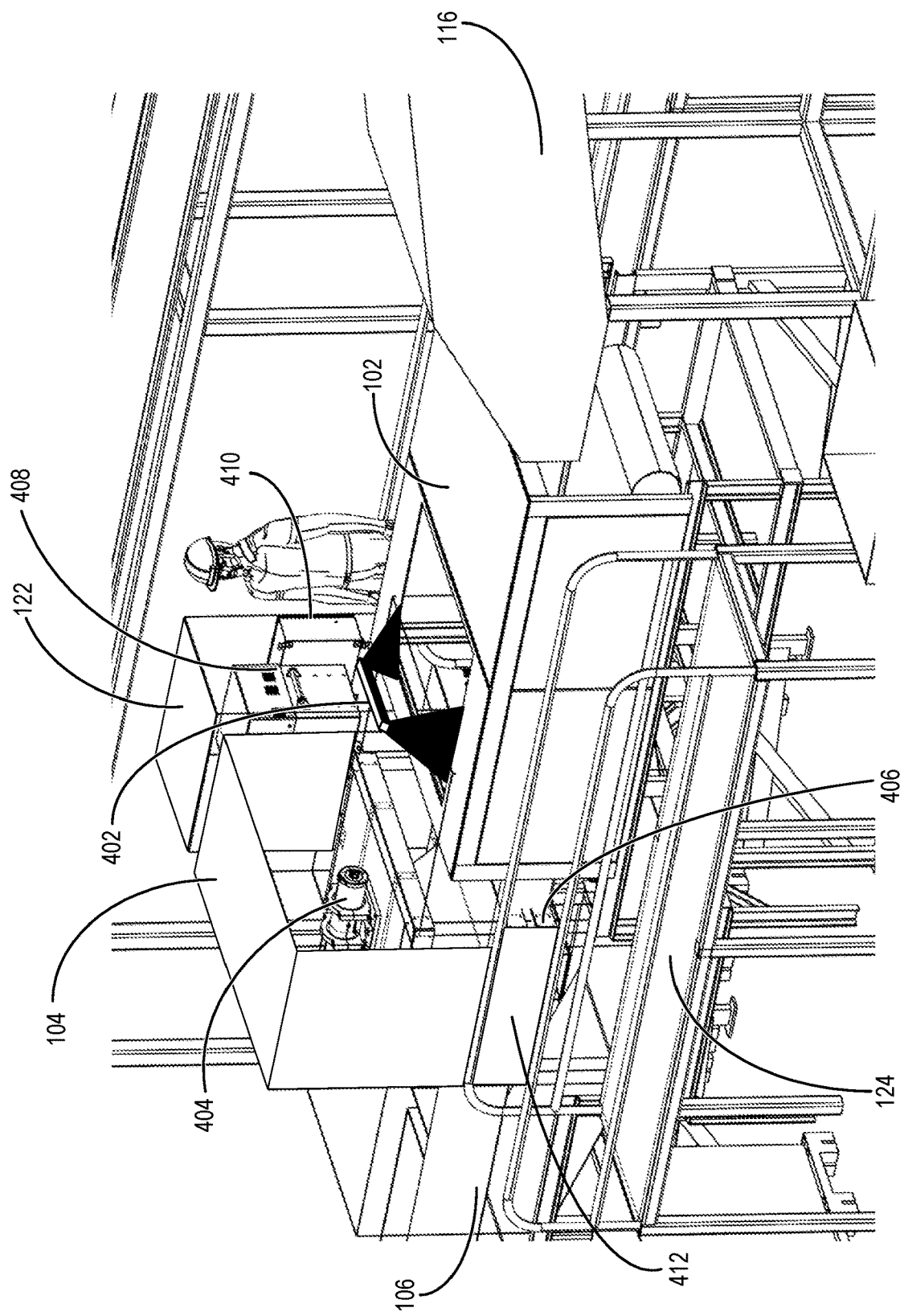
FIG. 4 illustrates a perspective view of a scanning bay of an automated battery sorting system in accordance with one or more embodiments.
Figure 5A:
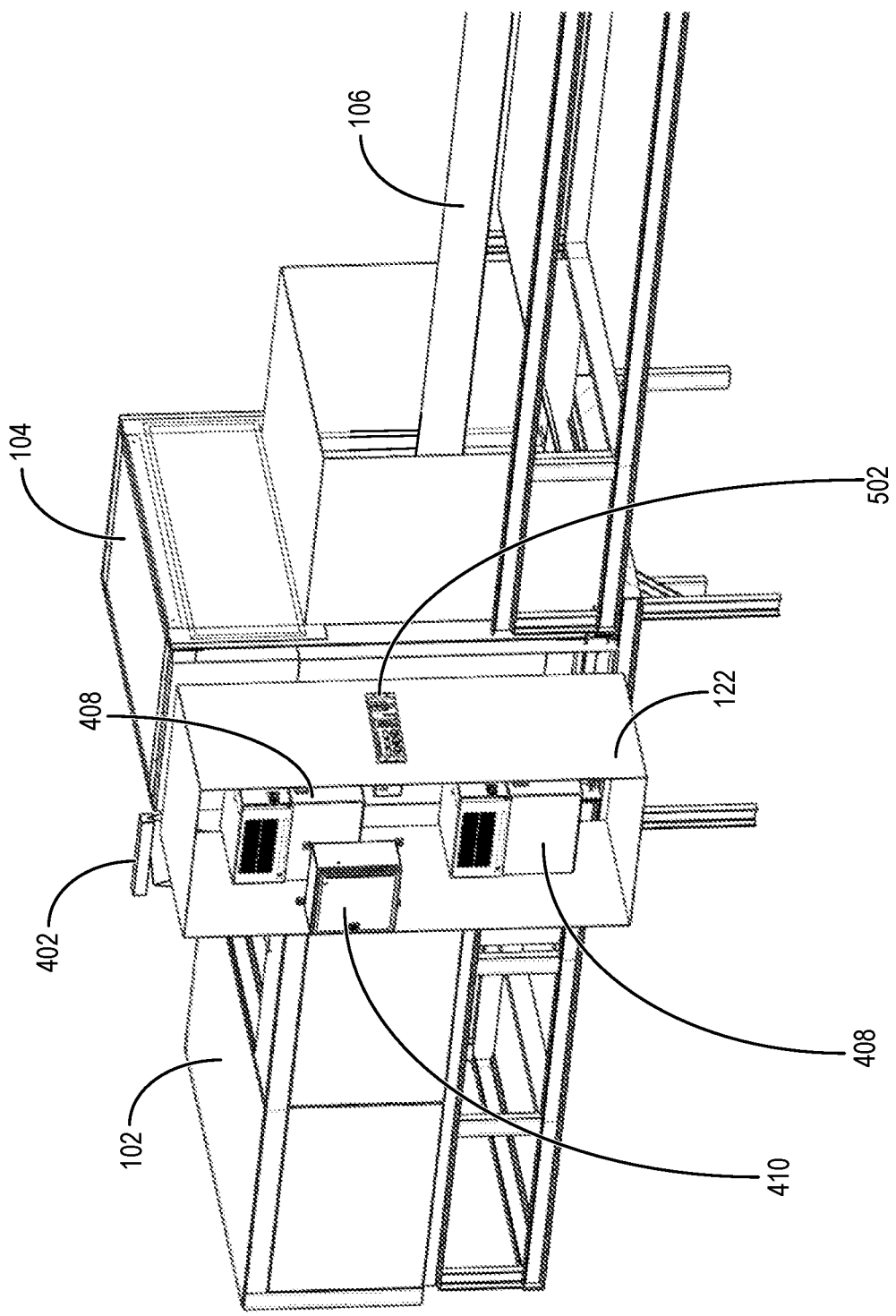
FIGS. 5A-5B illustrate additional perspective views of a scanning bay of an automated battery sorting system in accordance with one or more embodiments.
Figure 5B:
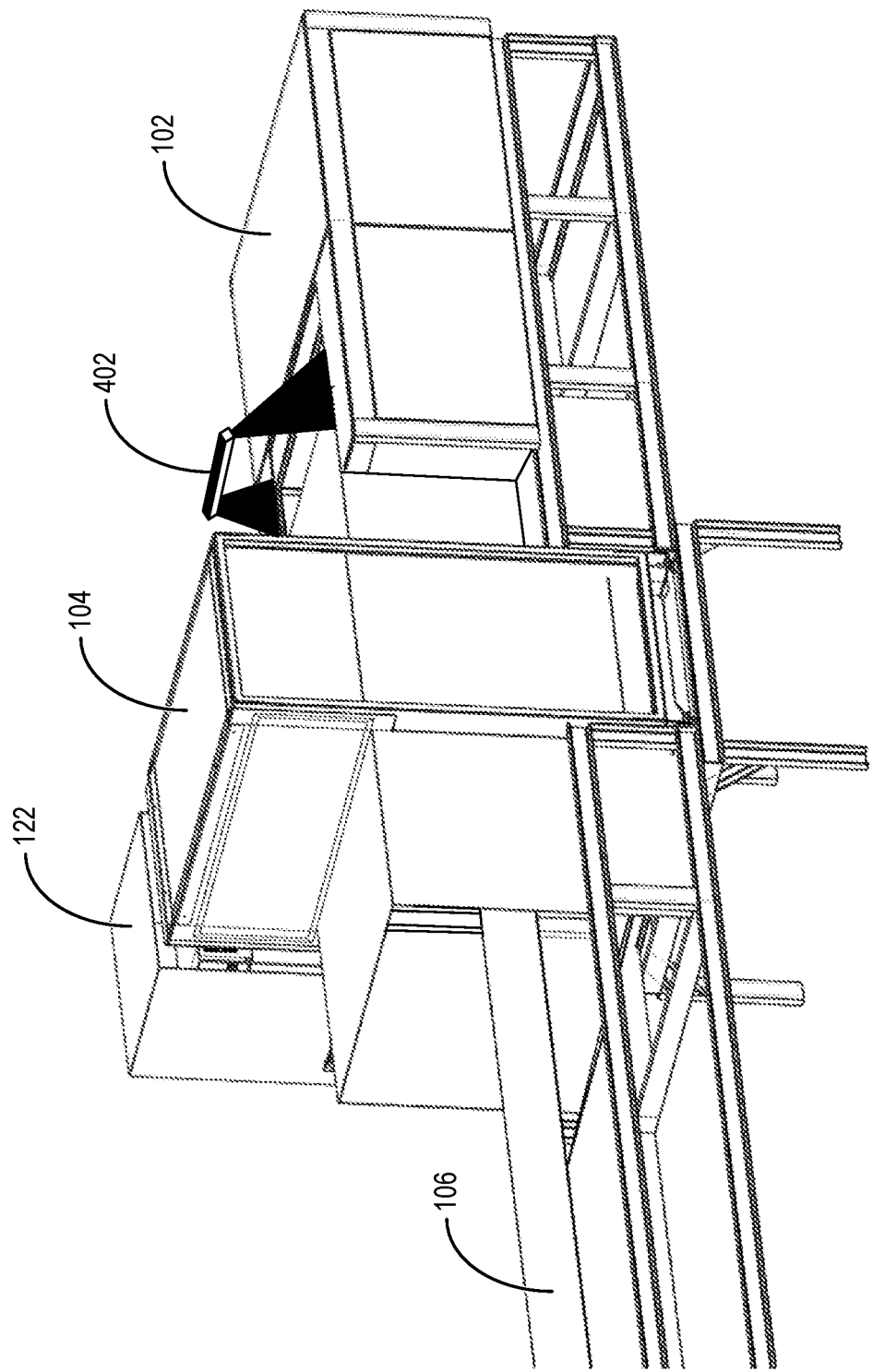
Figure 6:
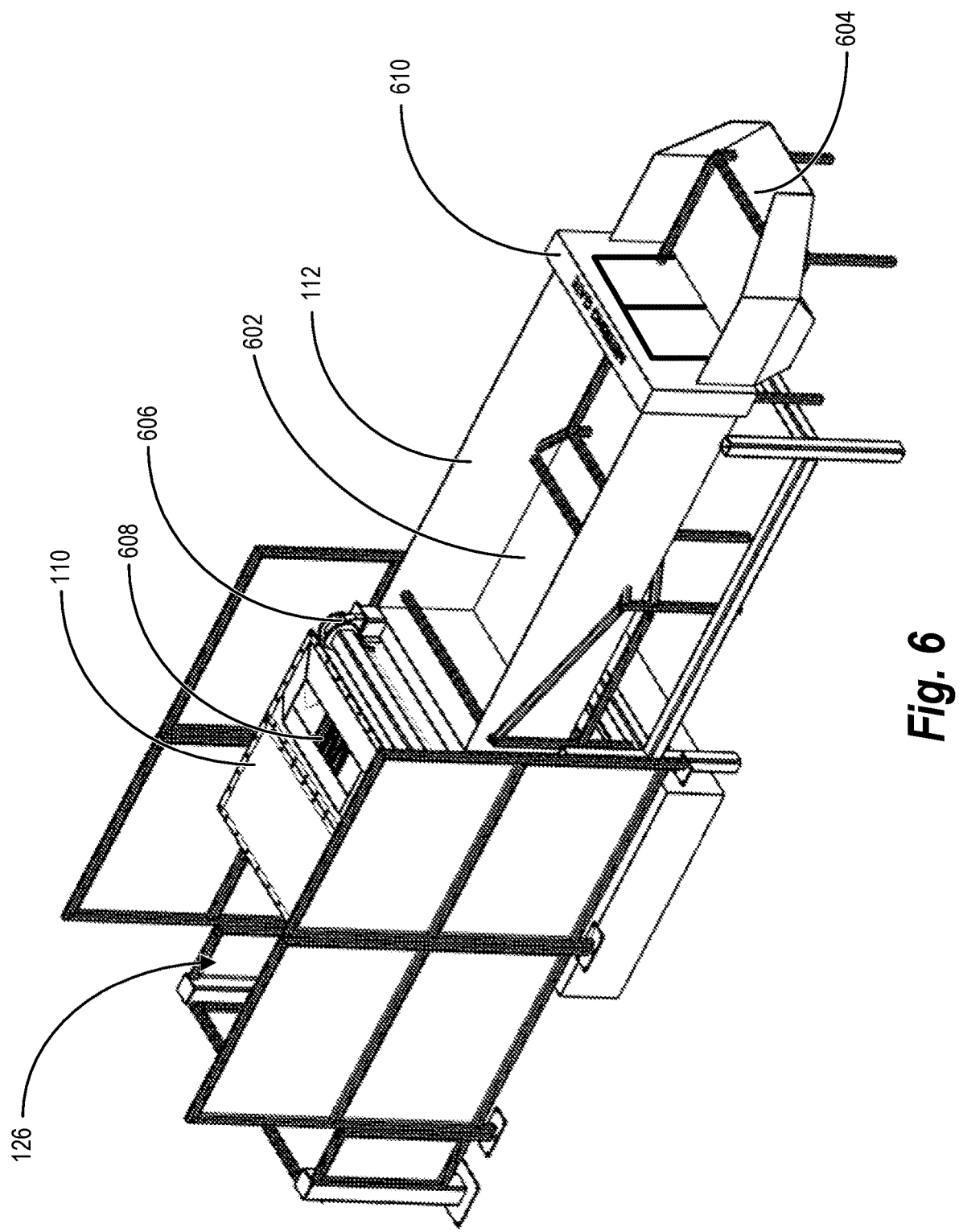
FIG. 6 illustrates a perspective view of a battery tipper and hopper assembly of an automated battery sorting system in accordance with one or more embodiments.

Additional detail will now be provided in relation to illustrative figures portraying example embodiments and implementations of the disclosed methods, apparatuses, and systems. For example, FIGS. 1-6 illustrate various views of an automated battery sorting system 100 according to one or more embodiments. Specifically, FIG. 1 illustrates a perspective view of the automated battery sorting system 100, FIG. 2 illustrates an additional perspective view of the automated battery sorting system 100, and FIG. 3 illustrates a top view of the automated battery sorting system 100. Furthermore, FIG. 4 illustrates a perspective view of scanning bays 102 and 104 of the automated battery sorting system 100 and FIGS. 5A-5B illustrate additional perspective views of the scanning bays 102 and 104. In addition, FIG. 6 illustrates a perspective view of a tipper mechanism 110 and a hopper 112 of the automated battery sorting system 100.

As illustrated in FIGS. 1-3, the automated battery sorting system 100 comprises a tipper mechanism 110 configured to receive large batches of batteries for sorting. In some embodiments, the tipper mechanism 110 comprises a large chamber or bin 126 into which unsorted batteries can be placed to begin the sorting process. In some embodiments, for example, a load of batteries can be transferred directly into the bin 126 from a battery collection container, barrel, truck bed, pallet, or the like. Moreover, the tipper mechanism 110 can include an apparatus for moving the batteries from the bin 126 into a hopper 112, such as but not limited to a movable platform, a slide, a pneumatic lifter and/or tipper, or a conveyor belt. Accordingly, batteries placed within the bin 126 pass from the bin 126, via the tipper mechanism 110, into the hopper 112, which forces the batteries to pass individually for subsequent scanning. In some embodiments, for example, the hopper comprises a vibrating table configured to separate batteries within a batch by form factor and/or weight. For instance, in some implementations, the hopper 112 removes smaller batteries from the batch as they move away from relatively larger batteries. Additional details and examples pertaining to the tipper mechanism 110 and the hopper 112 are described below in relation to FIG. 6.

As further illustrated in FIGS. 1-3, in some embodiments, individual batteries pass from the hopper 112 onto an inclined conveyor 114 and drop down a feeder 116 for individual scanning, classification, and sorting. Alternatively, in one or more embodiments, batteries are directed from the hopper 112 directly towards a scanning area of the automated battery sorting system 100. For example, an outlet of the hopper 112 can be positioned directly above or otherwise proximate to a scanning area or a horizontal conveyor of the automated battery sorting system 100. Further, in some embodiments, the automated battery sorting system 100 includes one or more actuators and/or structures configured to align incoming batteries prior to entering subsequent scanning areas. For example, the automated battery sorting system 100 can align individual batteries for single measurement and single ejection/diversion into associated storing bins. Also, in some embodiments, one or more alignment mechanisms (e.g., actuators, structures, etc.) can position incoming batteries at a specified angle related to x-rays and other scanning sources to increase measurement accuracy. Alignment mechanisms can include but are not limited to guide rails, pneumatic arms, shaker tables, expanding/detracting brackets, a gate, and so forth.

In the illustrated embodiment, each battery slides or otherwise passes down the feeder 116 individually towards a first scanning bay 102 and a second scanning bay 104. In particular, the first scanning bay 102 is equipped with one or more sensors, such as but not limited to one or more RGB cameras, an infrared (IR) camera, or a 3D scanner. Moreover, the 3D scanner can include, but is not limited to, one or more of optical cameras, 3D laser scanners, computed tomography scanners, structure-light 3D scanners, LiDAR, or time-of-flight laser scanners. Accordingly, in one or more embodiments, the automated battery sorting system 100 utilizes the variety of visual sensors to scan each battery within the first scanning bay 102. As further described below (e.g., in relation to FIGS. 7-10), the automated battery sorting system 100 utilizes a variety of sensors to determine, based on sensor signals, attributes of each battery and, based on the determined attributes, predicts a battery classification or categorization for each battery.

In addition, the sensor(s) of the first scanning bay 102, optionally, a second scanning bay 104 of the automated battery sorting system 100 comprises an x-ray scanning array configured to emit and detect x-ray beams as they pass through each battery for further analysis (i.e., to provide additional input to a battery classifier model). In some embodiments, either or both of the first scanning bay 102 and the second scanning bay 104 further include alignment mechanisms configured to position each battery in an ideal position and/or orientation for scanning procedures. Such alignment mechanisms can include, for example, a series of bumpers/rails, movable actuators, tumblers, or other apparatuses operable to reposition small to large batteries. As also mentioned, in response to scanning each battery at the first and second scanning bays 102 and 104 to determine various attributes of each battery, the automated battery sorting system 100 utilizes a classifier model to determine a predicted battery classification for each battery.

In any event, the automated battery sorting system 100 includes at least one scanning bay and a plurality of sensors. As shown in FIGS. 1-3, in at least one embodiment, the automated battery sorting system 100 includes two scanning bays 102 and 104 that each house a different type of scanner. In one or more implementations, the first scanning bay 102 includes one or more sensors that detects/measures/captures a first type of attribute of a battery. Similarly, the second scanning bay 104 includes one or more additional sensors that detects/measures/captures a second type of attribute of a battery that is different than the first type of attribute.

For example, in one or more implementations, the first scanning bay 102 includes one or more sensors that detects/measures/captures one or more visible attributes of a battery (e.g., the first type of attribute). In particular, the one or more sensors of the first scanning bay 102 detects/measures/captures one or more of a size of battery (e.g., volume, height, width), a color of a battery, a shape of a battery, text on a battery, etc. Similarly, in one or more implementations, the second scanning bay 104 includes one or more sensors that detects/measures/captures one or more non-visible attribute of a battery (e.g., the second type of attribute). In particular, the one or more sensors of the second scanning bay 104 detects/measures/captures one or more of a temperature of a battery, x-ray attenuation of a battery, an atomic number of one or more materials of a battery, the material composition of a battery, the weight of a battery, etc.

As also shown in FIGS. 1-3, the automated battery sorting system 100 includes one or more platforms 124 to provide access for a screener or operator to the scanning bays 102 and 104 and other areas of the system. Furthermore, the screener platform 124 shown provides access to a support cabinet 122 housing various components of the scanning systems of bays 102 and 104, such as generators, IO feeds, analog controls, and/or a digital operator console.

In addition, some embodiments of the automated battery sorting system 100 include one or more infrared cameras positioned at one or more positions within the system to monitor batteries for elevated temperatures and, in some cases, include a safety mechanism. For example, the safety mechanism can comprise one or more of an alarm, a fire extinguisher, a battery dunk tank, or an emergency power off (EPO). The safety mechanism configured to activate in response to a signal from at least one sensor of the multiple types of sensors. For example, the automated battery sorting system 100 includes a safety receptacle (e.g., a dunk tank)

for disposing of batteries with elevated temperatures when detected by the one or more infrared cameras. The safety receptacle comprises a fire-retardant material. Alternatively, the automated battery sorting system 100 is configured to add a fire-retardant material to the safety receptacle once the battery is added to the safety receptable. As used herein, the term "safety receptacle" refers to a receptacle for storing batteries and other potentially hazardous materials. In one or more embodiments, the safety receptacle can be made from durable and fireproof materials such as metals, etc. Additionally, the term "fire-retardant material" or "fire suppressant" refers to a material utilized for prevention of fires related to volatile materials, such as metals, combustible liquids, or lithium-ion batteries. For example, in some implementations, a fire suppressant can include a mineral-based extinguishing agent, such as Vermiculite, Perlite, Expanded Clay, Expanded Polystyrene (EPS), CellBlockEX, and other fire, heat, and/or smoke suppressant compounds.

Also, in one or more embodiments, various components of the automated battery sorting system 100 are lined with a shock absorbent material (e.g., rubber) to reduce shock on the batteries as they pass through the system. Moreover, in some embodiments, the automated battery sorting system 100 includes anti-static coatings on metal surfaces thereof to reduce the risks of electrical shorting of batteries.

As illustrated, after passing from the scanning bays 102 and 104, each battery continues along a conveyor 106 towards a plurality of sorting bins 108. The automated battery sorting system 100 displaces each target battery into one of the sorting bins 108 according to the predicted classification for each respective battery. In particular, the sorting bins 108 comprise a bin for each battery configuration of a plurality of battery configurations. Furthermore, in one or more implementations, one or more of the sorting bins 108 comprises a safety bin (e.g., In some embodiments, for example, the automated battery sorting system 100 utilizes a plurality of actuators or gates (i.e., diverters) to move the target battery to the associated bin of the sorting bins 108. As shown in FIG. 2, for instance, some embodiments include a movable actuator 202 that is selectively positioned to push, pull, or guide incoming batteries into sorting bins 108 according to the predicted classification. Alternatively, or additionally, embodiments of the automated battery sorting system 100 can include sorting mechanisms comprising pneumatic actuators, guides, hoists, cranes, platforms, or alternative means for diverting batteries into respective bins of the sorting bins 108. Furthermore, in some embodiments, the automated battery sorting system 100 includes one or more sensors configured to validate that a battery has been received by the proper sorting bin 108. For example, validating sensors can include but are not limited to cameras or pressure sensors integrated with the sorting bins 108.

FIGS. 1-3 illustrate the automated battery sorting system 100 with two rows of sorting bins 108. Specifically, FIGS. 1-3 illustrate a row of sorting bins on each side of the conveyor 106. In alternative implementations, the automated battery sorting system 100 includes more or less than two rows of sorting bins. For example, in one or more implementations, the automated battery sorting system 100 includes a single row of sorting bins 108 on a single side of the conveyor 106. Alternatively, the automated battery sorting system 100 includes three or four rows of sorting bins 108. For instance, the automated battery sorting system 100 includes multiple rows of sorting bins 108 on each side of the conveyor 106 at different vertical heights.

As also shown, the automated battery sorting system 100 includes return conveyors 118, 120, and 128 for returning batteries to the hopper 112 (or alternatively to the receiving bin 126 of the tipper mechanism 110) in instances where an additional scan and/or analysis is needed. For example, in some cases, a battery classification may be unsatisfactory if for any reason the battery was not properly scanned, or if a previously unseen configuration of battery is encountered. In at least some such cases, the battery is returned to the front of the automated battery sorting system 100 to repeat the scanning and classification processes. In some embodiments, batteries for which a battery classification is inconclusive or otherwise unsatisfactory are sorted into a bin of the sorting bins 108 designated for alternative handling. In some implementations, unidentified batteries are allowed to pass to the end of the conveyor 106 to drop into one or more bins 130 positioned at an ending of the conveyor 106.

Moreover, in some embodiments, in lieu of (or in addition to) the sorting bins 108 being positioned in proximity to the conveyor 106, the automated battery sorting system 100 can include additional conveyors proximate the primary conveyor 106 and configured to deliver batteries to individual bins or to another area for sorting and/or further processing. Thus, in some embodiments, the aforementioned actuators can divert batteries onto the additional conveyors according to a predicted classification for each respective battery.

As shown in FIGS. 4 and 5A-5B, the scanning bays 102 and 104 include one or more sensors for scanning batteries as they pass from feeder 116 and across conveyor 106. For instance, the scanning bay 102 includes a scanning bar 402 comprising one or more of a three-dimensional (3D) scanner, an RGB camera, or an infrared (IR) camera. In additional embodiments, the scanning bay 102 includes additional sensors at additional locations to provide for scanning batteries at a variety of angles and/or distances with respect to each battery as it passes through the scanning bay 102. For example, in some embodiments, multiple cameras are provided at various locations to capture images of each side of each battery. For example, in addition or as an alternative to being located in the scanning bar 402, an RGB camera is located to the side of the conveyor so as to be able to capture a side view of a battery passing through the scanning bay 102. Further, in some embodiments, additional sensors are provided to measure a weight of each battery for additional input into predicting corresponding battery configurations.

Furthermore, as shown in FIG. 4, scanning bay 104 comprises an x-ray scanning array comprised of an x-ray emitter 404 and an x-ray detector 406. In one or more embodiments, for example, the x-ray emitter is mounted to a housing of the scanning bay 104 and directed to emit x-ray beams towards the conveyor 106. Correspondingly, in one or more embodiments, the x-ray detector 406 is mounted below the conveyor 106, such that the x-ray detector 406 detects and measures x-ray beams emitted from the x-ray emitter 404 through each battery as they pass through the scanning bay 104. Additionally, in one or more embodiments, the x-ray detector 406 is encased within a retractable drawer 412, thus facilitating adjustment and maintenance of the x-ray detector 406. In additional implementations, the scanning bay 104 includes more than one x-ray scanning arrays. For example, the scanning bay 104 includes two, three, or more-ray detector arrays that each are aligned at different angles relative to a battery positioned on the conveyor 106. In particular, in addition to measuring x-ray attenuation passing vertically through a battery as shown in FIG. 4, the scanning bay 104 includes an x-ray scanning array that measures x-ray attenuation passing horizontally through a battery. In such implementations, the automated battery sorting system 100 includes an x-ray emitter on one side of the conveyor 106 and an x-ray detector on the opposite side of the conveyor 106. In any event, one will appreciate in light of the disclosure herein that the scanning bays 102, 104 can include sensors that on one or more sides of the conveyor 106, vertically above and/or below the conveyor 106, and at one or more acute angles relative to the conveyor 106 (e.g., 30 degrees, 45 degrees, 60 degrees, 120 degrees, 135 degrees, 150 degrees).

Moreover, as also shown in FIGS. 4 and 5A-5B, the support cabinet 122 includes generators 408 for powering the x-ray scanning array and/or other components of the automated battery sorting system 100. In addition, the illustrated support cabinet includes an IO box 410 (i.e., an input/output module) and a control assembly 502 (see FIG. 5A). While the control assembly 502 shown is an analog controller associated with the x-ray scanning array, embodiments of the automated battery sorting system 100 can also include an operating console capable of controlling the sensors of both scanning bays 102 and 104, as well as other aspects of the battery classification and sorting systems of the automated battery sorting system 100.

As further shown in FIG. 6, the automated battery sorting system 100 also includes the tipper mechanism 110 with the receiving bin 126 for receiving batches of batteries for classification and sorting. With a batch of batteries loaded into the receiving bin 126 of the tipper mechanism 110, an actuator 606 of the tipper mechanism 110 raises the batch of batteries into the hopper 112 to be dispersed towards subsequent sections of the automated battery sorting system 100. In some embodiments, for example, the actuator 606 rotates (i.e., tips) a chamber of the tipper mechanism 110 upward until batteries disperse from an opening 608 proximate the hopper 112. Additional examples of actuators for moving batches of batteries from the receiving bin 126 to the hopper 112 can include, for example, a conveyor belt, a movable platform, a drop chute (e.g., with the receiving bin 126 positioned above the hopper 112), and so forth. Alternatively, batteries can be loaded directly into the hopper 112 by hand, a conveyor, a fork lift, or other loading mechanisms.

As mentioned previously, the hopper 112 vibrates the batteries to separate them and disperse them onto the inclined conveyor 114, directly into the feed chute 116, or otherwise towards the scanning areas of the automated battery sorting system 100. For example, in some embodiments, the hopper 112 is configured to individually disperse the batteries therefrom via tapered outlet 604 onto inclined conveyor 114 (see FIGS. 1-3). As illustrated, the hopper 112 includes a shaker table 602 configured to separate and guide batteries towards the tapered outlet 604. In some embodiments, the hopper 112 also comprises progressively narrowing rails or sidewalls that further guide batteries towards the tapered outlet 604 as they are shaken apart from one another by the shaker table 602. In some embodiments, the batteries are guided through a tapered chamber with or without the use of a shaker table.

As also shown in FIG. 6, the hopper 112 can further include a metering gate 610. In one or more embodiments, for example, the metering gate 610 can include one or more sensors for detecting individual batteries as batteries pass between through the metering gate 610 towards the tapered outlet 604. In some embodiments, metering gates like the metering gate 610 are positioned in one or more alternative locations of the automated battery sorting system 100 to keep track of the quantity of batteries passing through various sections of the automated battery sorting system 100.

As mentioned previously, the disclosed embodiments include a battery classification system configured to intelligently classify batteries of various types or configurations (i.e., various classifications) based on a plurality of sensor signals, such as those discussed above in relation to the automated battery sorting system 100 of FIGS. 1-6. For example, FIG. 7 illustrates a schematic overview of a battery classification system 704 operating according to one or more embodiments.

Figure 7:
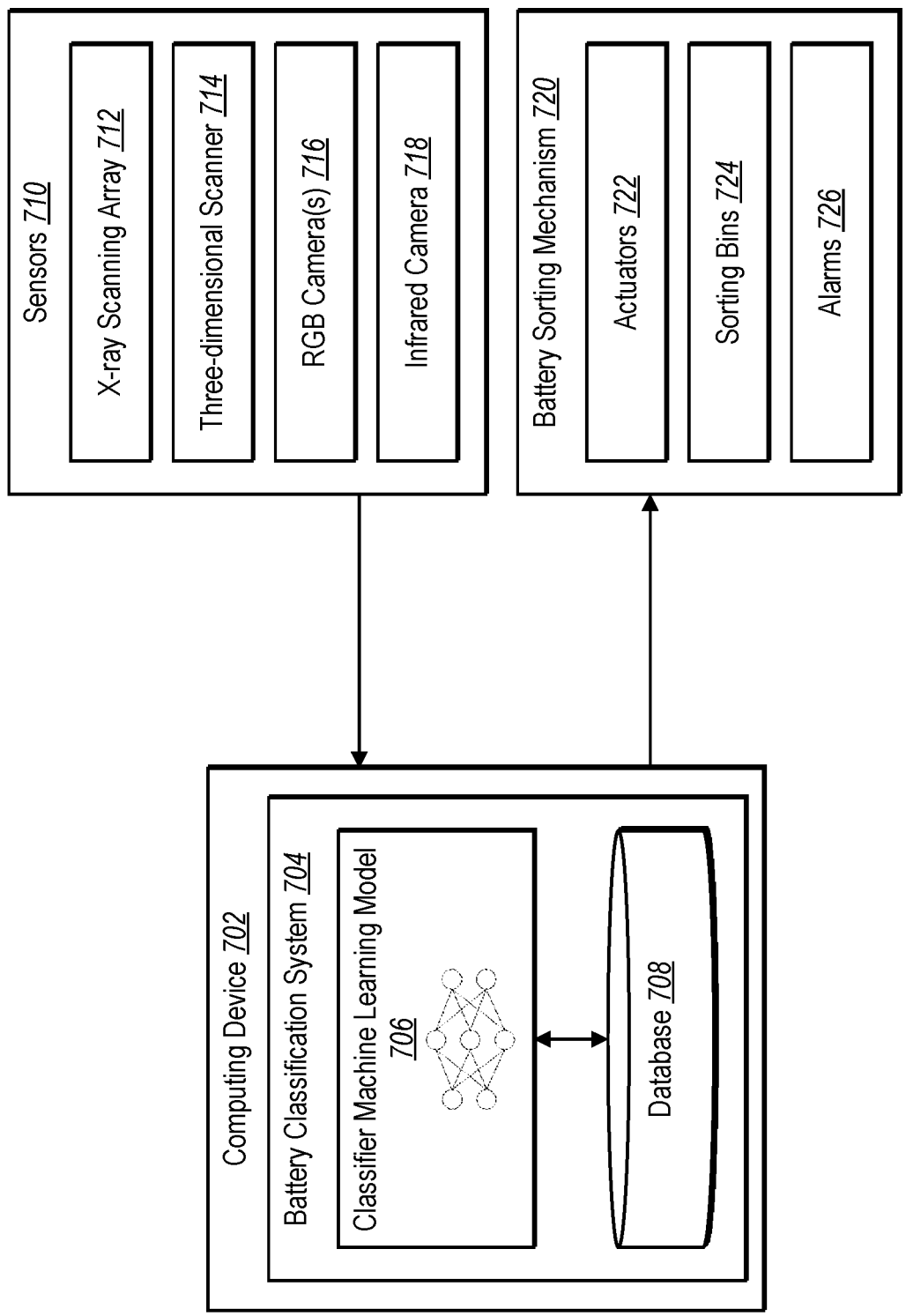
FIG. 7 illustrates a diagram of an environment in which a battery classification system can operate in accordance with one or more embodiments.

As shown in FIG. 7, in some embodiments, a computing device 702 includes the battery classification system 704 that is in communication with a plurality of sensors 710 and a battery sorting mechanism 720. In alternative embodiments, the battery classification system 704 is included on one or more server device(s) in communication with the computing device 702, the plurality of sensors 710, and/or the battery sorting mechanism 720 via network. Indeed, various configurations of computing devices, server devices, storage devices, sensors, and other components are anticipated by the present disclosure.

As illustrated in FIG. 7, the battery classification system 704 includes a classifier model 706 and a database 708 containing a plurality of battery classifications and their associated attributes (i.e., chemical compositions, form factors, and other attributes of batteries within each respective classification of the plurality of battery classifications). Accordingly, the battery classification system 704 compares and/or is trained using the battery classification data contained in database 708 to make battery classification predictions based on signals from the plurality of sensors 710. As mentioned previously, in one or more embodiments, the classifier model 706 comprises a machine learning model trained to classify batteries based on a plurality of signals from the plurality of sensors 710.

As shown in FIG. 7, in some embodiments, the plurality of sensors 710 include an x-ray scanning array 712 (e.g., as discussed above in relations to the second scanning bay 104, the x-ray emitter 404, and the x-ray detector 406), a three-dimensional (3D) scanner 714 (e.g., as discussed above in relation to the first scanning bay 102 and scanning bar 402), one or more RGB cameras 716 (e.g., as discussed above in relation to the first scanning bay 102 and scanning bar 402), and/or an infrared camera 718 (e.g., as discussed above in relation to the first scanning bay 102 and scanning bar 402). Indeed, embodiments of the battery classification system 704 can include any or all sensors of the plurality of sensors 710 shown, as well as additional sensors for scanning/imaging target batteries. Moreover, while FIGS. 1-6 illustrate exemplary types, configurations, and placements of sensors for scanning batteries, alternative embodiments include different types, configurations, and placements of the plurality of sensors 710. Further, in some embodiments, sensor data is received from alternative sources or indirectly from the plurality of sensors 710, such as within a data package received with each target battery.

As also shown in FIG. 7, in one or more embodiments, the battery classification system 704 is in communication with the battery sorting mechanism 720, which includes a plurality of actuators 722 for sorting batteries into a plurality of sorting bins 724 (e.g., as described above in relation to FIGS. 1-6). For example, in response to predicting a battery classification for a target battery, the battery classification system 704 indicates to the battery sorting mechanism 720 the predicted classification and, in some implementations, the location of the target battery on the conveyor 106. In response, the battery sorting mechanism 720 utilizes one or more actuators of the plurality of actuators 722 (e.g., actuator 202) to move the target battery into a bin of the sorting bins 724 corresponding to the predicted battery classification.

Additionally, in some embodiments, the battery classification system 704 is configured to detect anomalies within batteries and respond accordingly. For example, as shown in FIG. 7, the plurality of sensors 710 includes the infrared camera 718, which is configured to monitor incoming batteries for elevated temperatures or other thermal anomalies. When an elevated temperature (or otherwise undesirable thermal condition) above a particular threshold is detected, the battery classification system 704 indicates the anomaly to the battery sorting mechanism 720, which in turn activates one or more alarms 726, halts the sorting process, and/or ejects the subject battery (e.g., displaces the subject battery into a safety receptacle (e.g., a dunk tank or other enclosure)).

Figure 8:
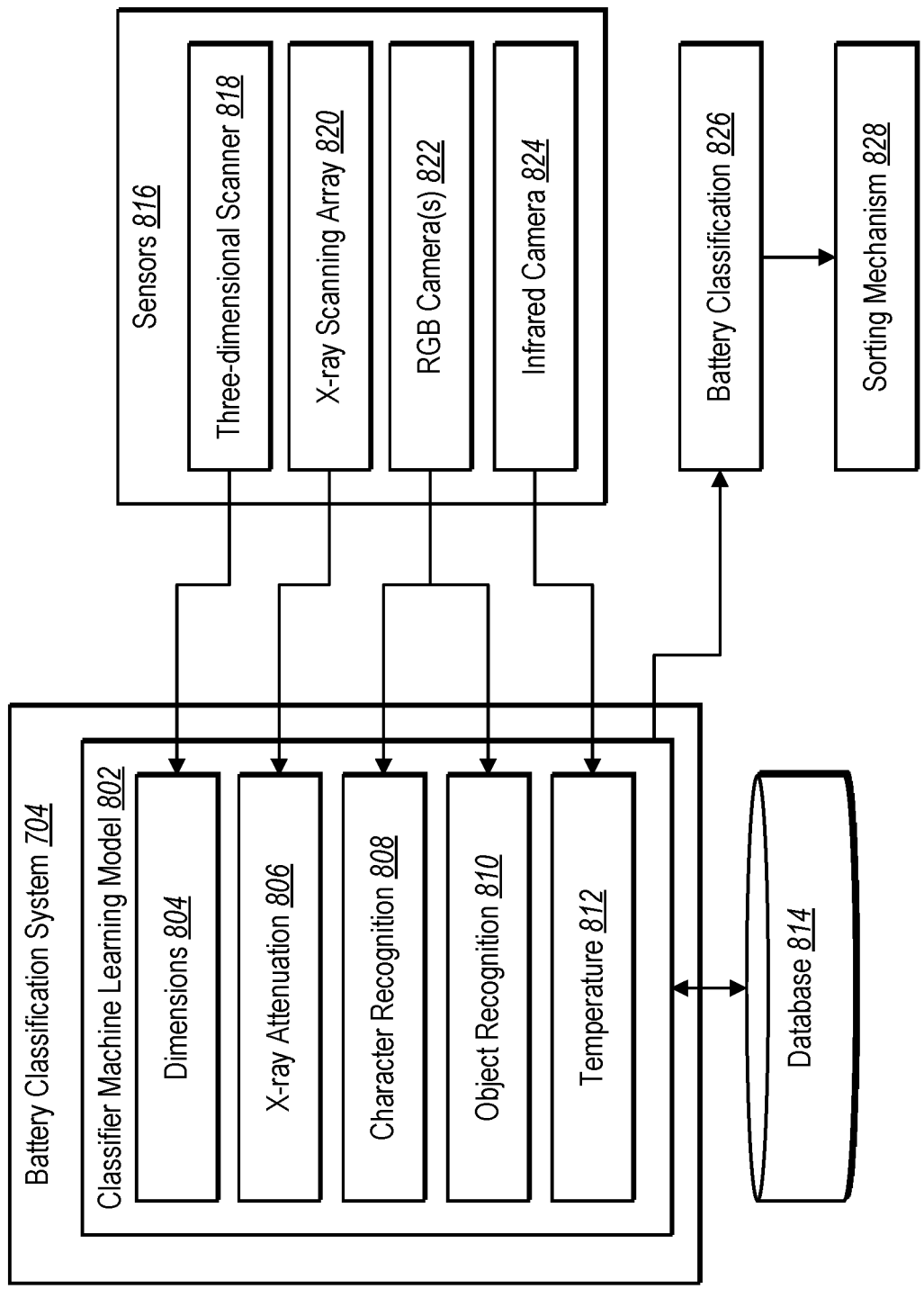
FIG. 8 illustrates a schematic diagram of a battery classification system in accordance with one or more embodiments.

As mentioned above, the battery classification system 704 can predict battery classifications based on signals from a plurality of sensors utilizing a classifier model. For instance, FIG. 8 illustrates the battery classification system 704 determining a battery classification 826 utilizing a classifier machine learning model 802 in accordance with one or more embodiments. Specifically, FIG. 8 shows the battery classification system 704 receiving a plurality of signals from the sensors 816 and utilizing the classifier machine learning model 802 to determine the battery classification 826 from a plurality of battery classifications stored in database 814. Battery classifications, for example, can include various categorizations of batteries, such as but not limited to chemical compositions, sizes, intended uses, commercial brands, model type/number, and so forth. Chemical compositions of batteries can include, for example, lithium, lithium ion, aluminum-ion, magnesium-ion, sodium-ion, potassium-ion, alkaline, nickel, carbon zinc, silver oxide, aluminum air, zinc air, zinc carbon, zinc chloride, zinc-ion, lead-acid, or any variety of battery compositions received for classification by the battery classification system 704.

As shown in FIG. 8, the plurality of sensors 816 includes a three-dimensional (3D) scanner, an x-ray scanning array 820, one or more RGB camera(s) 822, and an infrared (IR) camera 824. The sensors 816 capture/measure signals that are passed to the battery classification system 704. The battery classification system 704 determines one or more attributes of a battery from the signals. The classifier machine learning model 802 determines a battery classification from the one or more attributes.

In the illustrated embodiment, for instance, the battery classification system 704 receives an image from the 3D scanner 818. From the image, the battery classification system 704 determines one or more physical attributes of a battery in the image. For example, the battery classification system 704 determines one or more dimensions 804 of a target battery from signals (e.g., data) received from the 3D scanner 818. In particular, the battery classification system 704 determines one or more of a height, a width, a length, or a volume of a target battery. The classifier machine learning model 802 generates a battery classification 826 based at least in part on the dimension(s) 804.

Alternatively, in one or more embodiments, for example, the battery classification system 704 manipulates signals received from the 3D scanner 818 to determine or generate an attribute of the target battery. For example, the battery classification system 704 generates a three-dimensional profile of a target battery. In particular, the battery classification system 704 uses one or more images or 3D scans to reconstruct a three-dimensional shape or profile of a target battery. In other words, the battery classification system 704 determines a shape of a target battery from signals from the sensors 816. The classifier machine learning model 802 generates a battery classification 826 based at least in part on the shape or profile of the target battery.

Also, the battery classification system 704 determines one or more measures of x-ray attenuation 806 from signals received from the x-ray scanning array 820 for the target battery. In one or more embodiments, for example, the x-ray scanning array 820 writes x-ray data associated with a target battery to cache memory in one or more data subsets (i.e., chunks). Accordingly, the battery classification system 704 can access the one or more data subsets for a target battery and, in cases where multiple subsets correspond to a single battery, concatenate the multiple subsets for subsequent processing. In some embodiments, the battery classification system 704 receives signals from the x-ray scanning array 820, monitors a temperature of one or more scintillators of the x-ray scanning array 820, and, when necessary, recalibrates an x-ray gain lookup table according to static offsets and gain rates per pixel as each varies in real-time (e.g., in response to temperature). In one or more embodiments, the battery classification system 704 determines the x-ray attenuation 806 utilizing the x-ray gain lookup table to normalize signals from detectors of the x-ray scanning array 820 to obtain attenuation measurements adjusted according to the aforementioned real-time updates. Further, in some embodiments, the battery classification system 704 utilizes a time decay model to reduce the effects of afterglow from scintillators exhibited in any given signal from the x-ray scanning array 820.

Additionally, in some embodiments, the battery classification system 704 aligns high and low energy pixels from signals of the x-ray scanning array 820 to generate high/low energy pairs for determining what fraction of the received pixels fall into defined areas which are associated with given chemical compositions of batteries (e.g., as indicated in the database 814). Also, in one or more embodiments, the battery classification system 704 aligns segmented 3D scans (e.g., received from the 3D scanner 818) for target batteries with corresponding low and high energy scans received from the x-ray scanning array 820 to utilize distributions and ratios of battery height to x-ray attenuation magnitude in determining the chemical composition or categorization of the target batteries. Accordingly, the battery classification system 704 described herein can store inferred predictions and/or confidence levels in memory or transmit such results directly to the classifier machine learning model 802 for further analysis or to the battery sorting mechanism 828 for sorting of the subject batteries according to the inferred predictions and/or confidence levels.

In one or more embodiment, the battery classification system 704 receives x-ray attenuation values 806 from the x-ray scanning array 820. using these signals, the battery classification system 704 determines an attribute of the target battery. For example, the battery classification system 704 determines a battery chemistry or material composition of the battery from the attenuation values 806. The classifier machine learning model 802 generates a battery classification 826 based at least in part on the battery chemistry or material composition of the target battery.

More specifically, the battery classification system 704 receives x-ray attenuation values 806 in the form of high energy attenuation values and low energy attenuation values for a target battery. In one or more implementations, the battery classification system 704 generates an attenuation energy curve by plotting the high energy attenuation values vs low energy attenuation values. The battery classification system 704 the determines the battery chemistry from the attenuation energy curve. For example, the battery classification system 704 stores a known attenuation energy curve for different battery chemistries in the database 814. The battery classification system 704 maps a generated attenuation energy curve to a known attenuation energy curve to determine a battery chemistry for a target battery.

In addition, the battery classification system 704 receives one or more images (e.g., signals) of the target battery from RGB camera(s) 822. The battery classification system 704 generates one or more attributes from the one or more images. For example, the battery classification system 704 utilizes character recognition 808 and object recognition 810 to determine additional attributes of the target battery. In one or more embodiments, for example, RGB camera(s) 822 include one or more overhead cameras mounted/positioned to view each target battery from each side thereof (e.g., top, front, back, sides). The battery classification system 704 can utilize camera drivers to segment batteries from RGB images using background subtraction techniques, store segmented images in cache memory (e.g., a Redis cache comprising an in-memory key-value store for storage and retrieval of images and data) and associate a location and/or position of the respective battery with the stored images. Thus, the battery classification system 704 can access segmented images from memory and perform object and/or character recognition on the associated batteries. For example, the battery classification system 704 determines printed characters or codes on a label of the target battery. The classifier machine learning model 802 generates a battery classification 826 based at least in part on the printed characters or codes of the target battery.

In one or more implementations, the battery classification system 704 utilizes the classifier machine learning model 802, to compare words, characters, and other recognized data with different battery types within the database 814. In some embodiments, the classifier machine learning model 802 includes one or more deep learning models configured to perform object recognition to identify a specific make and/or model of each target battery.

Moreover, in some embodiments, the battery classification system 704 receives one or more image frames from the RGB camera(s) 822, segment each image frame to locate one or more individual batteries within the frame, links image frames which include a same battery (e.g., utilizing a shape or outline of the battery), performs the character recognition 808 and/or the object recognition 810, and associates the resulting object/character output(s) with a battery ID and/or physical position of the battery (e.g., an x-y position on a conveyor belt of a battery sorting apparatus).

Further, the classifier machine learning model 802 receives signals from the infrared camera 824 corresponding to the temperature 812 and/or thermal profile of the target battery. As previously mentioned, in some embodiments, the battery classification system 704 can activate one or more safety measures in response to detecting, via signals from the infrared camera 824, that a battery exhibits an elevated temperature (e.g., upon determining that a temperature of a target battery has reached a threshold temperature) or other thermal anomaly. For example, in response to detection of a thermal anomaly in a target battery, the battery classification system 704 can activate an alarm and/or fire extinguisher (or fire retardant), evacuate the target battery into a dunk tank or other disposal, shut down a battery sorting apparatus, and/or notify/warn a user of the anomaly.

Accordingly, as shown in FIG. 8, the classifier machine learning model 802 determines a battery classification 826 for a target battery based on one or more of the dimensions 804, x-ray attenuation 806, character recognition 808, object recognition 810, or temperature 812 indicated by the signals received from sensors 816. In some embodiments, for example, the classifier machine learning model 802 aggregates inferences generated from signals of the various sensors 816 (as described above) to generate a final battery classification. For example, in one or more implementations, the classifier machine learning model 802 utilizes a decision tree to generate the battery classification 826 based on the attributes of the target battery determined from the signals from the sensors 816. Alternatively, the classifier machine learning model 802 comprises a classification neural network. In such implementations, the classification neural network concatenates values for the attributes of the target battery. The classification neural network utilizes a first set of neural network layers (e.g., an encoder) to generate a feature vector from the concatenated attribute values. The classification neural network utilizes a second set of neural network layers (e.g., a decoder) to generate the battery classification 826 form the feature vector.

Moreover, in one or more embodiments, if the classifier machine learning model 802 is unable to determine a battery classification within a threshold confidence level, the battery classification system 704 issues an error signal to the sorting mechanism 828. In such cases, for example, the sorting mechanism 828 can re-route the target battery for a repeated attempt at classification or displace the battery into a bin designated for batteries having inconclusive classifications.

Furthermore, in some embodiments, the battery classification system 704 indicates the battery classification 826 to a sorting mechanism 828 for sorting of the target battery. In one or more embodiments, for example, the battery classification system 704 provides a position of a classified battery, such as coordinates associated with a conveyor belt, and the sorting mechanism 828 utilizes the transmitted position to inform sorting actuators in moving batteries into corresponding sorting bins or, as described above, onto corresponding additional conveyors. In some embodiments, the classifier machine learning model 802 comprises a machine learning model trained to predict battery classifications as described herein. Alternatively, some embodiments include a combination of classical (e.g., mathematical) models and one or more machine learning models.

Figure 9:
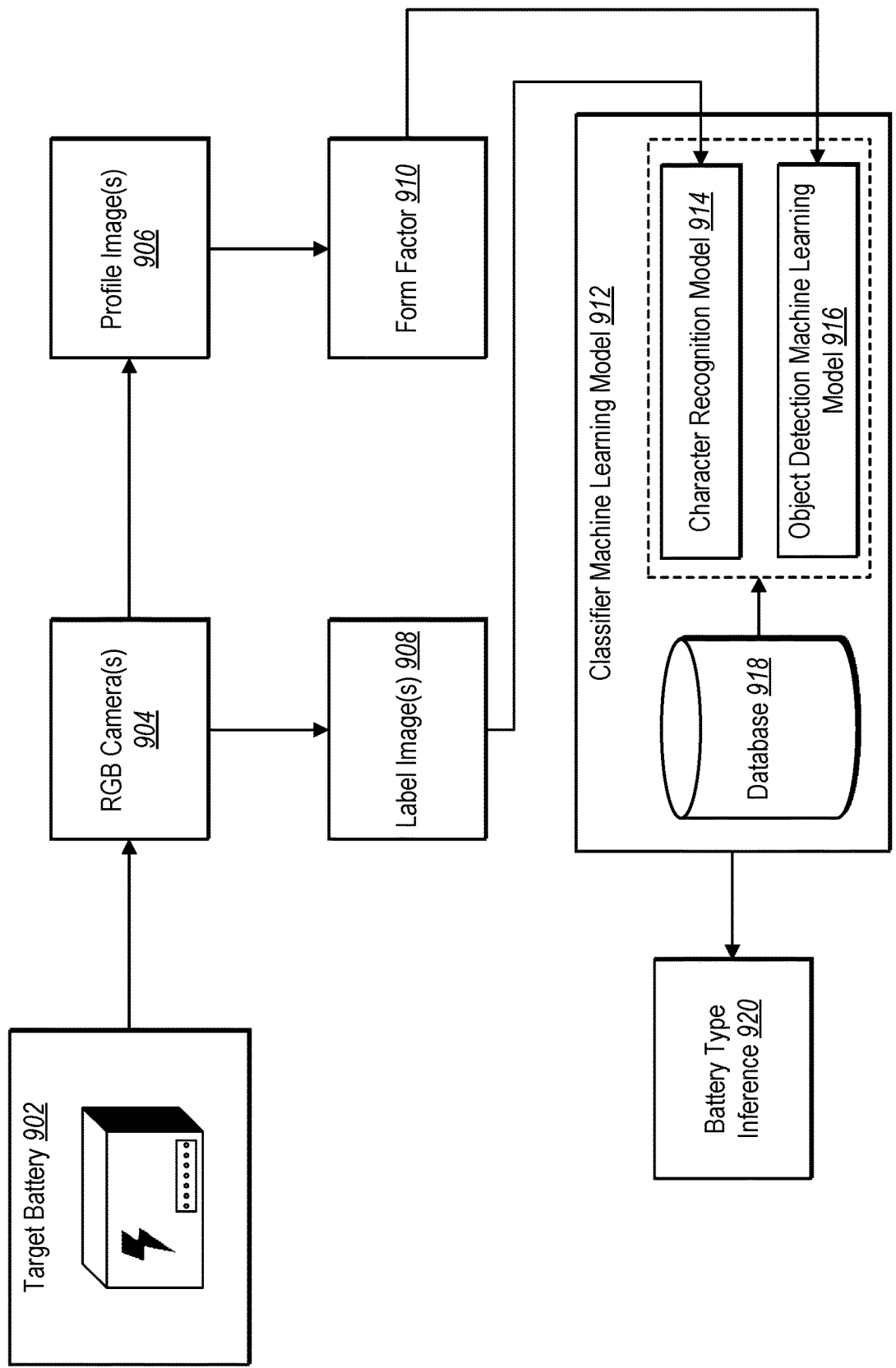
FIG. 9 illustrates a battery classification system utilizing an RGB camera in accordance with one or more embodiments.

As mentioned above, in one or more embodiments, the battery classification system 704 utilizes images from one or more RGB cameras as input for determining a battery classification of a target battery. For example, FIG. 9 illustrates the battery classification system 704 utilizing images from one or more RGB cameras 904 to determine a battery type inference 920 for a target battery 902.

For instance, the one or more RGB cameras 904 provide one or more images 908 of labels included on the target battery 902, from which the classifier model 912 performs character recognition 914 (e.g., OCR) and compares the recognized characters with a database 918. For example, characters recognized by character recognition 914 can be compared to characters in the database 918, or used to look up model numbers, serial numbers, and other related information that may be useful in determining the battery type inference 920 for the target battery 902.

Additionally or alternatively, the one or more RGB cameras 904 provide one or more profile images 906 of the target battery 902, the one or more profile images 906 indicating or comprising a form factor 910 of the target battery 902. In response, the classifier model 912 utilizes an object detection machine learning model 916 to compare visual attributes of the target battery 902 with data stored within the database 918 in order to determine the battery type inference 920 for the target battery 902. In addition, the classifier model 912 can be trained to recognize known form factors or other battery attributes based on form factors and attributes of battery configurations found in database 918.

For example, in one or more embodiments, the classifier model 912 comprises an object detection machine learning model 916 to detect classify batteries within a digital image. In one or more embodiments, the object detection machine learning model 916 comprises a deep learning convolutional neural network (CNN). For example, in some embodiments, the object detection machine learning model 916 comprises a region-based (R-CNN). Specifically, object detection machine learning model 916 includes lower neural network layers and higher neural network layers. In general, the lower neural network layers collectively form an encoder and the higher neural network layers collectively form a decoder. In one or more embodiments, the encoder includes convolutional layers that encodes a digital image into feature vectors, which are outputted from the encoder and provided as input to the decoder. In various implementations, the decoder comprises fully connected layers that analyze the feature vectors and output a battery classification. In one or more implementations, the object detection machine learning model 916 provides a prediction that a battery in an image is each battery classification of a plurality of battery classifications. For example, the object detection machine learning model 916 generates a classification vector having a prediction (e.g., a number between 0 and 1) indicating a predicted percentage (e.g., between 1 and 100%) that the battery in an image is each of a plurality of battery classifications. Thus, if there are 100 different battery classifications, the object detection machine learning model 916 can generate a classification vector having 100 entries. The classifier model 912 select the battery type inference 920 as the battery classification having the highest predicted percentage.

Figure 10:
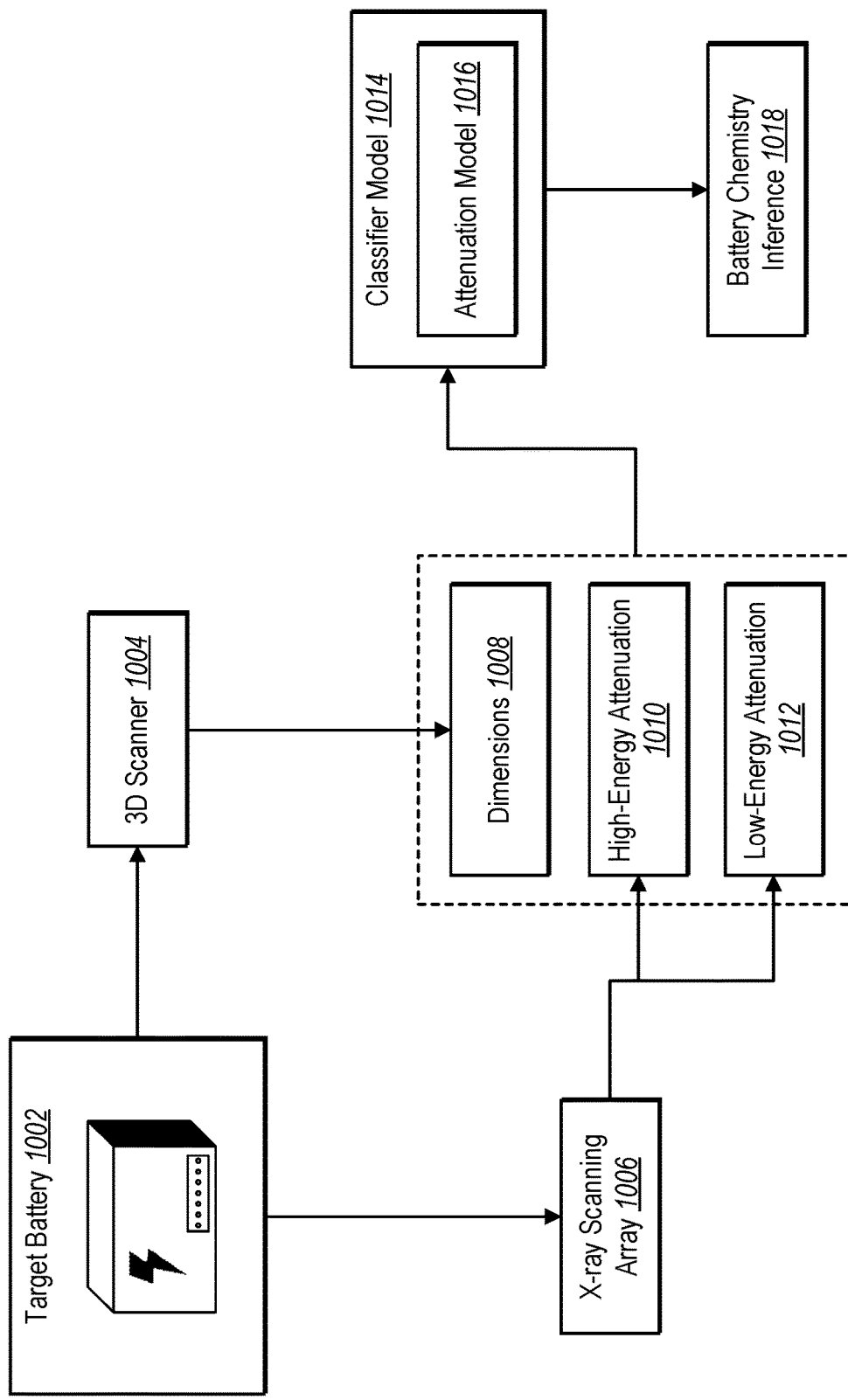
FIG. 10 illustrates a battery classification system utilizing a three-dimensional (3D) scanner and an x-ray scanning array in accordance with one or more embodiments.

As mentioned above, some embodiments of the battery classification system 704 utilize an x-ray scanning array and/or a 3D scanner to determine one or more attributes of a target battery, such as battery chemistry, in order to predict a battery classification. For example, FIG. 10 shows the battery classification system 704 utilizing inputs from a 3D scanner and an x-ray scanning array 1006 to determine battery chemistry inference 1018 for a target battery 1002.

For instance, in the illustrated embodiment, the battery classification system 704 receives or infers dimensions 1008 from the 3D scanner 1004 and receives or infers high-energy attenuation 1010 and low-energy attenuation 1012 measures from the x-ray scanning array 1006. In response, the battery classification system 704 utilizes an attenuation model 1016 of a classifier model 1014 to determine the battery chemistry inference 1018. In one or more embodiments, the x-ray scanning array 1006 includes a differential x-ray scanning array comprised of multiple x-ray scanning arrays positioned at different angles or locations with respect to the target battery 1002.

In one or more embodiments, the battery classification system 704 congruently processes signals from the x-ray scanning array 1006 and the 3D scanner 1004 for the target battery 1002 when determining the battery chemistry inference 1018. Upon segmenting the target battery 1002, for example, the battery classification system 704 can utilize images provided by the 3D scanner 1004 to determine the dimensions 1008, including an area, a centroid, and/or one or more rectangular crops for the target battery 1002. In one or more embodiments, the battery classification system 704 utilizes the dimensions 1008 and the signals from the x-ray scanning array 1006 to generate an alignment (e.g., a hashmap) of the high-energy attenuation 1010, the low-energy attenuation 1012, and the dimensions 1008 for the target battery 1002. In such embodiments, the battery classification system 704 can utilize the attenuation model 1016 of the classifier model 1014 to generate the battery chemistry inference 1018 based on the alignment of the dimensions 1008, the high-energy attenuation 1010, and the low-energy attenuation 1012 for the target battery 1002.

Furthermore, as discussed above, embodiments of the battery classification system 704 utilize a variety of signals from a variety of sensor to determine battery classifications for target batteries. For example, in some embodiments, the battery classification system 704 utilizes both the battery type inference 920 of FIG. 9 and the battery chemistry inference 1018 of FIG. 10 to determine a battery classification for a target battery. Indeed, embodiments of the battery classification system 704 can utilize any combination of data from various sensors, in conjunction with a classifier model, to predict battery classifications for target batteries.

Figure 11:
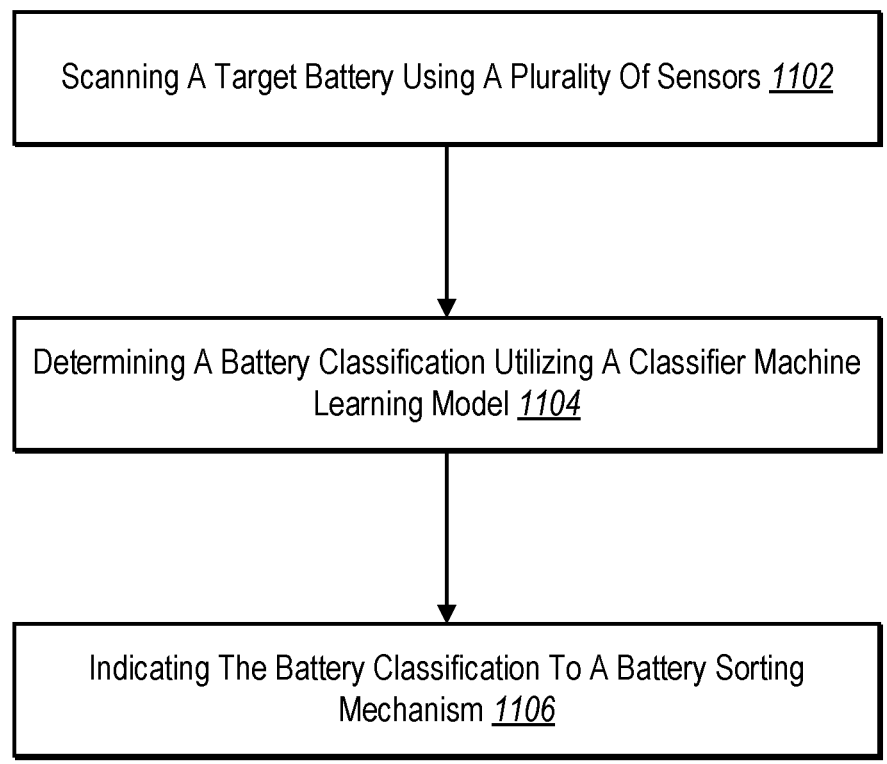
FIG. 11 illustrates a flowchart of a series of acts for classifying and sorting batteries in accordance with one or more embodiments.

FIGS. 1-10, the corresponding text, and the examples provide a number of different methods, systems, devices, and non-transitory computer-readable media of the battery classification system 704. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for classifying and sorting batteries in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause the one or more processors to perform the acts of FIG. 11. In some embodiments, a system can perform the acts of FIG. 11.

As shown, FIG. 11 illustrates an example series of acts 1100 for classifying and sorting batteries according to a plurality of battery classifications. The series of acts 1100 can include an act 1102 for scanning a target battery using a plurality of sensors. For example, in some embodiments, the act 1102 includes receiving, from a plurality of sensors, a plurality of signals corresponding to a target battery. In one or more embodiments, the act 1102 can include receiving, from a plurality of sensors, a plurality of signals corresponding to one or more detected attributes of a target battery, the one or more detected attributes comprising one or more of dimensions, battery chemistry, printed characters, or a form factor of the target battery. Furthermore, in some embodiments, the plurality of sensors comprises two or more of an x-ray scanning array, a three-dimensional (3D) scanner, an RGB camera, or an infrared camera.

In addition, as shown in FIG. 11, the series of acts 1100 can include an act 1104 for determining a battery classification utilizing a classifier machine learning model. For example, in some embodiments, the act 1104 includes determining, utilizing the classifier machine learning model, a predicted battery classification of the target battery from the plurality of battery classifications based on the plurality of signals. In one or more embodiments, the act 1104 can include determining, utilizing the classifier machine learning model, a predicted battery classification of the target battery from a plurality of battery classifications based on the one or more detected attributes of the target battery.

Moreover, in some embodiments, the act 1104 can include determining material attributes (e.g., a battery chemistry) of the target battery based on one or more x-ray attenuation measures received from an x-ray scanning array for the target battery and determining the predicted battery classification of the target battery based on the material attributes. For example, in some embodiments, the act 1104 can include receiving x-ray attenuation data for the target battery from an x-ray scanning array of the plurality of sensors and determining the predicted battery classification of the target battery based on the x-ray attenuation data.

In one or more embodiments, the act 1104 can include determining dimensions of the target battery based on scan data received from a three-dimensional (3D) scanner for the target battery and determining the predicted battery classification of the target battery based on the dimensions. Relatedly, in one or more embodiments, the act 1104 can include receiving scan data for the target battery from a three-dimensional (3D) scanner of the plurality of sensors, determining, based on the scan data, a plurality of dimensions of the target battery, and determining the predicted battery classification of the target battery based on the plurality of dimensions.

In some embodiments, the act 1104 can include determining a plurality of printed characters or codes disposed on the target battery based on image data received from an RGB camera for the target battery and determining the predicted battery classification of the target battery based on the plurality of printed characters or codes. Relatedly, in some embodiments, the act 1104 can include receiving one or more label images from an RGB camera of the plurality of sensors, identifying, utilizing object character recognition (OCR), a plurality of printed characters or codes from the one or more label images, and determining the predicted battery classification of the target battery based on the plurality of printed characters or codes.

Furthermore, in one or more embodiments, the act 1104 includes receiving one or more label images and one or more profile images of the target battery from a RGB camera of the plurality of sensors, determining, utilizing optical character recognition, the printed characters of the target battery from the one or more label images, determining the form factor of the target battery from the one or more profile images, and determining, utilizing the classifier machine learning model, the predicted battery classification of the target battery based on the printed characters and the form factor. Also, in some embodiments, the act 1104 can include receiving one or more profile images of the target battery from an RGB camera of the plurality of sensors, determining, based on the one or more profile images of the target battery, a form factor for the target battery, and determining the predicted battery classification of the target battery based on the form factor.

Moreover, in some embodiments, the act 1104 can include determining the dimensions of the target battery based on scan data from a 3D scanner of the plurality of sensors, determining the battery chemistry of the target battery based on x-ray attenuation data from an x-ray scanning array of the plurality of sensors, and determining, utilizing the classifier machine learning model, the predicted battery classification of the target battery based on the dimensions and the battery chemistry.

As also shown in FIG. 11, the series of acts 1100 can include an act 1106 for indicating the battery classification to a battery sorting mechanism. For example, in some embodiments, the act 1106 includes indicating, to a battery sorting mechanism, the predicted battery classification. Also, in some embodiments, the act 1106 includes transferring the target battery, utilizing the battery sorting mechanism, into a bin corresponding to the predicted battery classification of the target battery.

Also, in some embodiments, the act 1106 can include indicating, to a battery sorting mechanism, the predicted battery classification of the target battery and the additional predicted battery classifications of the additional batteries and individually transferring each battery of the target battery and the additional batteries, utilizing the battery sorting mechanism, into a plurality of bins respectively associated with the plurality of battery classifications.

Moreover, in one or more embodiments, the series of acts 1100 can include receiving, from the plurality of sensors, additional pluralities of signals corresponding to additional batteries, and determining, utilizing the classifier machine learning model, additional predicted battery classifications of the additional batteries from the plurality of battery classifications based on the additional pluralities of signals. Also, in some embodiments, the series of acts 1100 can include transferring the target battery, utilizing the battery sorting mechanism, into a first bin corresponding to the predicted battery classification of the target battery, determining, for an additional target battery, a predicted battery classification of the additional target battery based on an additional plurality of signals from the plurality of sensors, and transferring the additional target battery, utilizing the battery sorting mechanism, into a second bin corresponding to the predicted battery classification of the additional target battery.

Furthermore, in some embodiments, the series of acts 1100 can include determining a temperature or a temperature gradient of the target battery from signals received from an infrared camera for the target battery and in response to determining that the temperature or the temperature gradient is above a threshold value, activating an alarm. Moreover, in one or more embodiments, the series of acts 1100 can include receiving from an infrared camera of the plurality of sensors, an indication of a hazardous anomaly detected within at least one battery of the additional batteries and, in response, transferring the at least one battery into a dunk tank containing a fire retardant.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
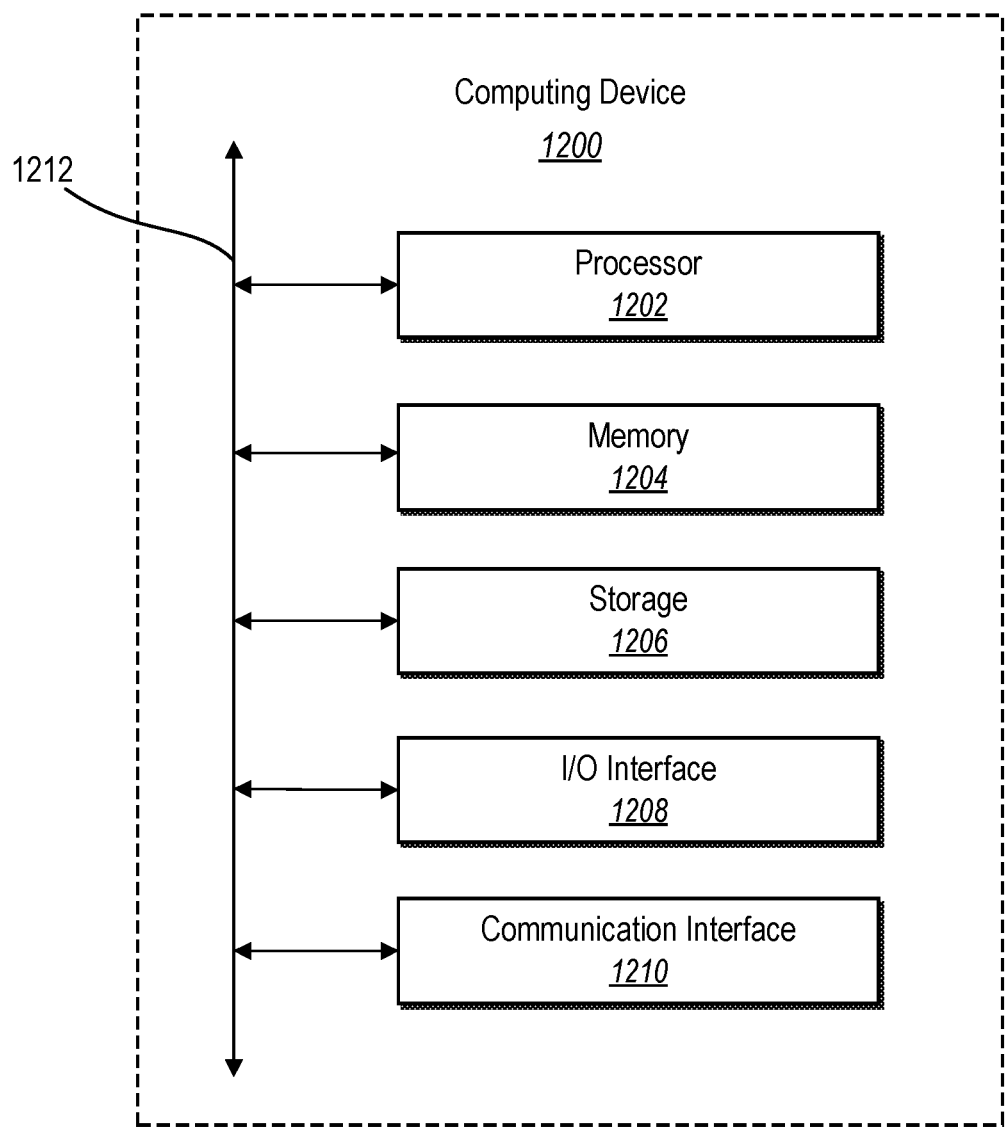
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 702). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities (e.g., a local server handling custom TCP or HTTP messages).

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting.

Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

In some embodiments, data storage within the storage device 1206 may include a Remote Dictionary Server (Redis) data structure comprising an in-memory key-value database for storing and indexing cached data throughout the battery classification and sorting processes described herein. In certain embodiments, for example, each sensor array of a plurality of sensor arrays (e.g., RGB camera(s), 3D scanner, x-ray scanning array) stores images and/or related information with time-dependent key-values representing x-y coordinates of the respective images (e.g., "rgb:390:8910"). Thus, the battery classification system 704 can associate information from each sensor array pipeline with respective physical coordinates when aggregating sensor signals to determine a battery classification for a target battery. Alternatively, or additionally, the battery classification system 704 can store a sorted list of coordinates for respective images, such that all images within a given range of coordinates are readily accessible when filtering for signals corresponding to the target battery.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. An apparatus for sorting batteries, the apparatus comprising:
   a feed mechanism comprising a hopper positioned above a conveyor and configured to individually discharge batteries of a plurality of batteries onto the conveyor;
   a scanner mechanism disposed about the conveyor, the scanner mechanism comprising multiple types of sensors configured to capture attributes of each battery of the plurality of batteries, the multiple types of sensors including a three-dimensional (3D) scanner configured to determine geometric dimensions of each battery of the plurality of batteries; and
   an array of sorting mechanisms disposed about the conveyor and comprising at least one actuator configured to selectively transfer the plurality of batteries from the conveyor to a plurality of bins based on a predicted battery configuration of each battery of the plurality of batteries determined based on the captured attributes of each battery.

2. The apparatus of claim 1, wherein the feed mechanism further comprises a vibrating table configured to separate and direct individual batteries of the plurality of batteries onto the conveyor.

3. The apparatus of claim 1, further comprising one or more scanning bays configured to receive, via the conveyor, individual batteries of the plurality of batteries to be scanned by the multiple types of sensors.

4. The apparatus of claim 1, wherein the multiple types of sensors further comprise one or more of an x-ray scanning array, an RGB camera, or an infrared camera.

5. The apparatus of claim 1, further comprising one or more processors configured to determine, based on sensor data from one or more sensors of the multiple types of sensors, the predicted battery configuration for each battery.

6. The apparatus of claim 1, further comprising at least one return conveyor disposed at an end of the conveyor and configured to return unsorted batteries to a start of the conveyor.

7. The apparatus of claim 1, further comprising a safety mechanism including one or more of an alarm, a fire extinguisher, a battery dunk tank, or an emergency power off (EPO), the safety mechanism configured to activate in response to a signal from at least one sensor of the multiple types of sensors.

8. An apparatus for classifying batteries, the apparatus comprising:
- one or more scanning bays configured to receive batteries of a plurality of battery configurations;
- two or more scanner mechanisms associated with the one or more scanning bays, the two or more scanner mechanisms comprising sensors configured to scan each battery as each battery passes through the one or more scanning bays, the two or more scanner mechanisms comprising an x-ray scanning array and a three-dimensional (3D) scanner; and
- one or more processors configured to determine, based on sensor data from the sensors of the two or more scanner mechanisms, a predicted battery configuration for each battery.

9. The apparatus of claim 8, further comprising a hopper mechanism configured to individually discharge the batteries onto a conveyor.

10. The apparatus of claim 9, wherein the one or more scanning bays are disposed about the conveyor to receive batteries individually discharged by the hopper mechanism.

11. The apparatus of claim 10, further comprising an array of sorting mechanisms disposed about the conveyor subsequent to the one or more scanning bays, the array of sorting mechanisms comprising one or more actuators configured to transfer each battery, based on the predicted battery configuration for each battery, from the conveyor to a respective bin of a plurality of bins.

12. The apparatus of claim 8, wherein the x-ray scanning array is configured to determine material properties of each battery.

13. The apparatus of claim 8, wherein the three-dimensional (3D) scanner is configured to determine geometric dimensions of each battery.

14. The apparatus of claim 8, wherein the one or more processors are configured to determine the predicted battery configuration for each battery by utilizing a machine learning model to process the sensor data from the sensors of the two or more scanner mechanisms.

15. An apparatus for sorting batteries of various configurations, the apparatus comprising:
- a feed mechanism comprising a hopper positioned above a conveyor and configured to individually discharge batteries of a plurality of batteries onto the conveyor;
- one or more scanner mechanisms proximate the conveyor, the one or more scanner mechanisms comprising multiple types of sensors configured to scan each battery as each battery passes on the conveyor;
- one or more sorting mechanisms disposed about the conveyor and comprising one or more actuators configured to transfer batteries of the plurality of batteries from the conveyor to a plurality of bins based on a predicted battery configuration of each battery determined based on attributes of each battery captured using the one or more scanner mechanisms; and
- a safety mechanism including one or more of a fire extinguisher, a battery dunk tank, or an emergency power off (EPO), the safety mechanism configured to activate in response to a signal from at least one sensor of the multiple types of sensors.

16. The apparatus of claim 15, wherein the one or more scanner mechanisms comprise an x-ray scanning array comprising an x-ray generator positioned above the conveyor and an x-ray detector positioned below the conveyor.

17. The apparatus of claim 15, the one or more scanner mechanisms comprise two or more of an x-ray scanning array, a three-dimensional (3D) scanner, an RGB camera, or an infrared camera.

18. The apparatus of claim 15, further comprising a return conveyor positioned after the one or more scanner mechanisms, the return conveyor configured to return batteries for which an accurate predicted battery configuration is not able to be determined to the one or more scanner mechanisms.

19. The apparatus of claim 15, wherein the one or more sorting mechanisms comprise one or more actuators configured to push, pull, or guide a battery into respective bins of the plurality of bins.

20. The apparatus of claim 15, wherein the safety mechanism is configured to activate in response to detecting a hazardous anomaly within a battery of the plurality of batteries.

* * * * *